United States Patent [19]

Balazs et al.

[11] Patent Number: 4,765,227

[45] Date of Patent: Aug. 23, 1988

[54] DIE CYLINDER ASSEMBLY

[75] Inventors: Les G. Balazs, Brecksville; Anthony J. Cydzik, Jr., Cleveland, both of Ohio

[73] Assignee: Teledyne Hyson, Brecksville, Ohio

[21] Appl. No.: 382,939

[22] Filed: May 28, 1982

[51] Int. Cl.[4] ............................................. F15B 15/17
[52] U.S. Cl. .................................. 91/417 R; 91/422; 92/163; 92/168; 72/453.13; 137/493.2; 100/269 R; 277/195; 277/198; 277/199; 267/119
[58] Field of Search ............. 91/357, 392, 404, 417 R, 91/419, 422, 435, 441; 92/111, 112, 163, 164, 165 R, 168; 72/453.13; 267/119, 129, 130, 137; 100/269 R; 137/493.1, 493.2; 277/165, 188 R, 188 A, 192, 193, 194, 195, 198, 199

[56] References Cited

U.S. PATENT DOCUMENTS

| | | |
|---|---|---|
| 2,523,358 | 9/1950 | Conner . |
| 2,742,878 | 4/1956 | Glenny et al. ............... 91/417 R |
| 2,787,254 | 4/1957 | Rhoades ...................... 91/417 R |
| 3,157,095 | 11/1964 | Heiser ................................ 91/395 |
| 3,202,411 | 8/1965 | Heiser ................................... 267/1 |
| 3,272,132 | 9/1966 | Stoelting et al. ................... 92/164 |
| 3,316,817 | 5/1967 | Ellis ................................. 91/422 |
| 3,457,765 | 7/1969 | Heiser .................................. 72/432 |
| 3,472,125 | 10/1969 | Noble ................................... 91/357 |
| 3,549,154 | 12/1970 | Jones .................................... 92/168 |
| 3,611,881 | 10/1971 | Little .............................. 92/165 R |
| 3,636,749 | 1/1972 | Heiser .................................. 72/351 |
| 3,674,955 | 7/1972 | Peek .................................... 91/404 |
| 4,068,680 | 1/1978 | Sliger ............................. 137/493.2 |
| 4,076,103 | 2/1978 | Wallis ................................ 267/119 |
| 4,111,030 | 9/1978 | Shepard et al. ..................... 72/351 |
| 4,259,895 | 4/1981 | Owens ................................. 92/163 |
| 4,342,448 | 8/1982 | Wallis ................................ 267/119 |
| 4,378,815 | 4/1983 | Mochida et al. ............... 137/493.2 |
| 4,447,047 | 5/1984 | Newell ............................... 267/118 |

FOREIGN PATENT DOCUMENTS

| | | |
|---|---|---|
| 906848 | 9/1962 | United Kingdom . |
| 1015674 | 1/1966 | United Kingdom ............ 137/493.2 |
| 1099306 | 8/1966 | United Kingdom . |
| 1598878 | 5/1978 | United Kingdom . |
| 2073077 | 3/1981 | United Kingdom . |

OTHER PUBLICATIONS

Hyson Super Nitro-Dyne Service Manual.
Hyson Super Nitro-Dyne Nitrogen Die Springs Catalog.
Hyson Pressure from Parallels Catalog.
Forward Brochure entitled "The Best In Nitrogen Die Cylinder Systems".

Primary Examiner—Deborah L. Kyle
Assistant Examiner—Richard L. Klein
Attorney, Agent, or Firm—Tarolli, Sundheim & Covell

[57] ABSTRACT

A die cylinder assembly is designed for use in an environment which has contaminants outside the assembly. The die cylinder assembly includes a piston disposed in a cylinder and having an outer end surface. The piston is moved in one direction by forces applied to the outer end surface of the piston. The piston is moved in an opposite direction by a working fluid pressure in a head end chamber of the cylinder. The cylinder includes a rod end variable volume chamber which is connected in fluid communication, through a first passage in the piston rod, with a third chamber located in the piston rod. The fluid pressure in the rod end chamber is always maintained at least as great as ambient fluid pressure to prevent contaminants from entering the rod end chamber. A check valve in a second passage admits outside air to the third chamber when fluid pressure in the third chamber drops below ambient pressure. A relief valve vents the third chamber if fluid pressure therein becomes too high. The assembly has an improved piston-cylinder seal for preventing fluid flow between the rod end chamber and the outside even when the piston rod is tilted relative to the cylinder.

23 Claims, 5 Drawing Sheets

DIE CYLINDER ASSEMBLY

BACKGROUND OF THE INVENTION

This invention relates generally to a new and improved die cylinder assembly for use in a press or the like. The die cylinder assembly is used to cushion movement of a die member holding a workpiece, when the workpiece is being formed by another die member.

A known die cylinder assembly is disclosed in U.S. Pat. No. 4,111,030. This known die cylinder operates in an environment which contains fluids such as die lubricants, dirt and other contaminating materials. These contaminants may tend to work their way in between the piston and cylinder of the die cylinder assembly. This increases wear and decreases operating life of the assembly.

In this known die cylinder assembly, the cylinder chamber is divided into a variable volume head end chamber and a variable volume rod end chamber. High pressure nitrogen, the working fluid in the head end chamber, resists movement of the piston upon operation of the press, to cushion piston movement. The rod end chamber is located near the end wall of the cylinder where the piston rod emerges from the cylinder. As the piston rod retracts into the cylinder, the rod end chamber expands and a reduced pressure is created therein. This tends to draw contaminants in between the piston rod and cylinder and into the rod end chamber.

In an attempt to eliminate this problem, the rod end chamber of this known die cylinder assembly is vented away from the die cylinder assembly by tubing. The tubing leads to a source of clean ambient air free of contaminants. Alternatively, the tubing leads to a supply of clean compressed air at a pressure slightly above ambient pressure.

SUMMARY OF THE INVENTION

The present invention provides an improved die cylinder assembly having a variable volume rod end chamber. Fluid pressure in the rod end chamber is always maintained at least as great as ambient fluid pressure. To this end, the rod end chamber is connected in fluid communication with a third chamber which is located within the piston rod itself. When the piston retracts, thereby expanding the rod end chamber, fluid at greater than ambient pressure will flow from the chamber in the piston rod into the rod end chamber. This maintains the fluid pressure in the rod end chamber at least as great as ambient fluid pressure, preventing contaminants from being drawn in between the piston and the cylinder.

In accordance with another feature of the present invention, a new and improved seal is provided where the piston rod extends through the end wall of the cylinder. This seal effectively blocks fluid flow between the rod end chamber and atmosphere even when the piston rod is tilted relative to the cylinder. This seal also prevents contaminants from entering between the piston rod and the cylinder when the piston rod is tilted.

Accordingly, it is an object of the present invention to provide a new and improved die cylinder assembly which prevents contaminants from being drawn into the die cylinder assembly by maintaining a rod end chamber at a pressure which is at least as great as ambient pressure during expansion of the rod end chamber.

It is a further object of this invention to provide a die cylinder assembly having a new and improved piston rod to cylinder seal assembly which seals effectively even when the piston rod is tilted relative to the cylinder.

BRIEF DESCRIPTION OF THE DRAWINGS

The foregoing and other objects and features of the present invention will become apparent upon a consideration of the following description taken in connection with the accompanying drawings wherein.

DESCRIPTION OF SPECIFIC PREFERRED EMBODIMENTS OF THE INVENTION

Figure 1:
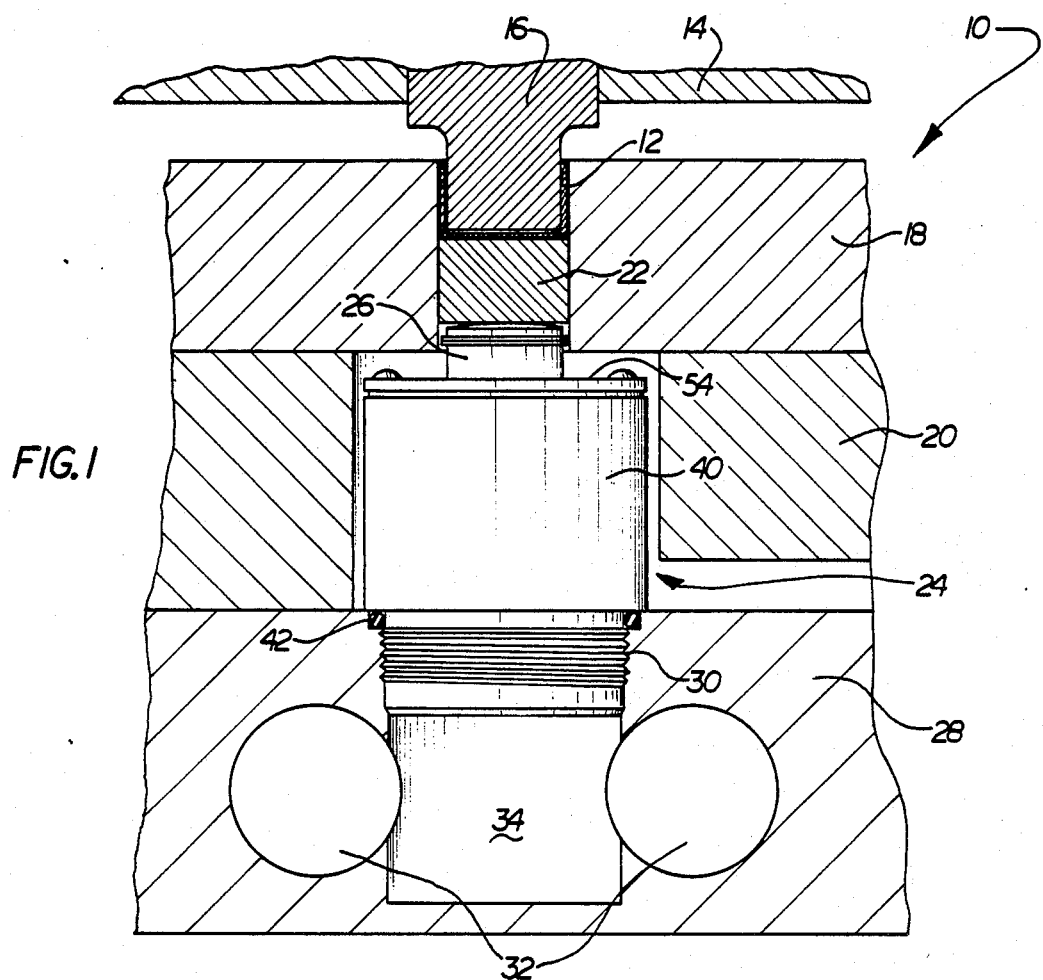
FIG. 1 is a fragmentary sectional view illustrating a press which includes a die cylinder assembly constructed in accordance with the present invention.

A press 10 (FIG. 1) is used to form a workpiece 12. The press 10 includes an upper die shoe 14 having a punch 16 for shaping the workpiece 12. The press 10 also includes a die member 18 mounted on a lower die shoe 20. A pressure pad 22 is disposed within the die member 18 beneath the workpiece 12. A die cylinder assembly 24 having a piston rod 26 cushions movement of the workpiece 12 and pressure pad 22 when the press assembly 10 operates to force the workpiece 12 and pressure pad 22 downwardly.

Figure 2:
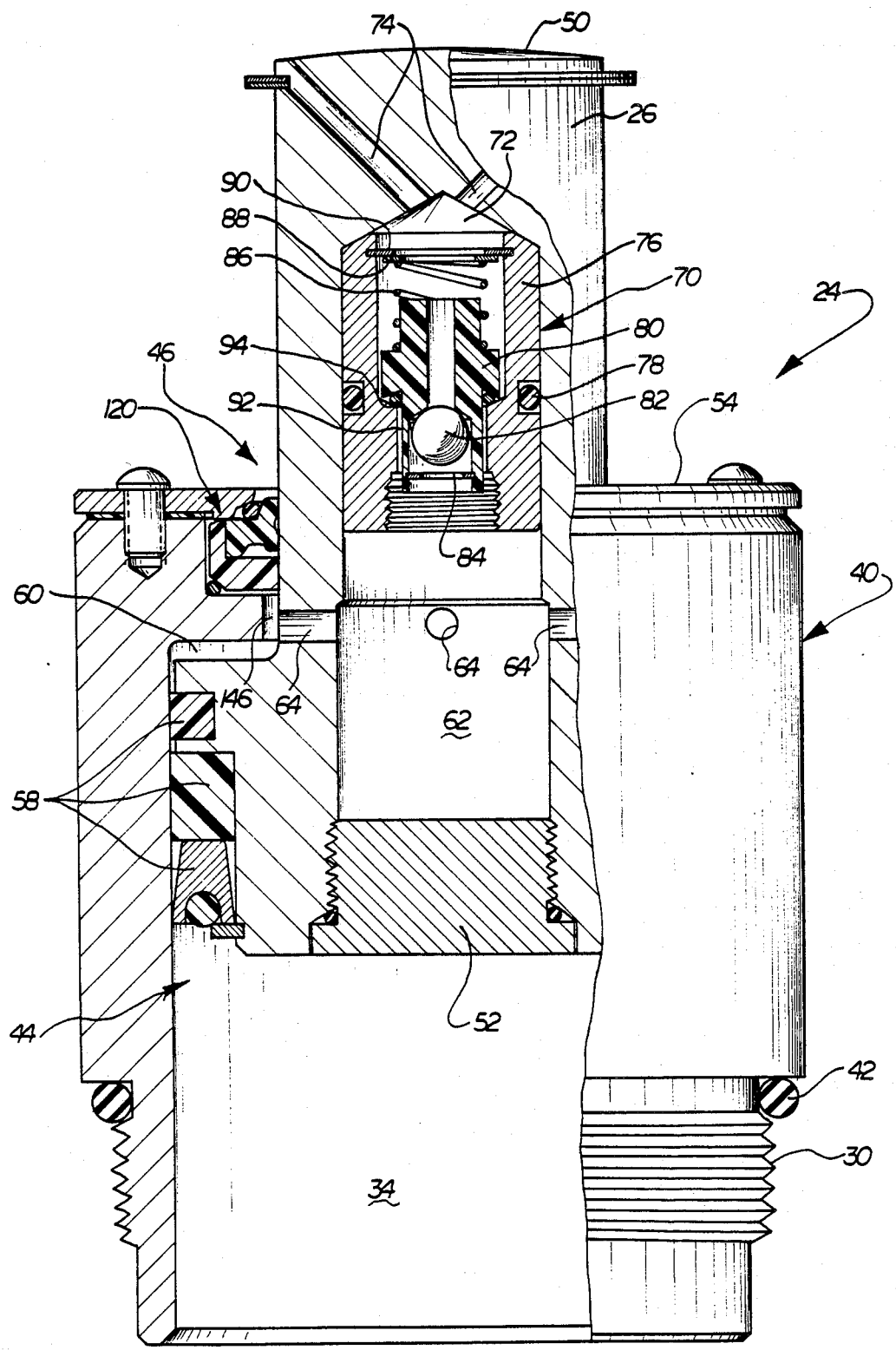
FIG. 2 is an enlarged sectional view of the die cylinder assembly of FIG. 1 illustrating a piston rod of the die cylinder assembly in an extended position.

A manifold 28 is located underneath the lower die shoe 20. The die cylinder assembly 24 is held in the manifold 28 by threads 30. Pressure chambers 32 in the manifold 28 contain a working fluid, which may be nitrogen, under high pressure. The pressure chambers 32 are connected in fluid communication with a head end chamber 34 of the die cylinder assembly 24. In the illustrated embodiment of the invention, the head end chamber extends from the manifold 28 into the die cylinder assembly 24 (FIG. 2). Of course, the head end chamber 34 could be disposed entirely within the die cylinder assembly 24 if desired.

The die cylinder assembly 24 (FIGS. 2 and 3) includes a cylinder housing 40 having threads 30 to mount the die cylinder assembly 24 in the manifold 28. The die cylinder assembly 24 is sealed in the manifold 28 by an O-ring 42. A cylinder chamber 44 receives a piston assembly 46 which includes the piston rod 26. The cylindrical piston rod 26 extends through an end wall 54 of the cylinder housing 40. An upper end surface 50 of the piston rod 26 abuts the pressure pad 22 (FIG. 1).

The piston assembly 46 (FIGS. 2 and 3) forms one end of the head end chamber 34. A seal assembly 58 seals the nitrogen in the head end chamber 34 to maintain working fluid pressure. High pressure nitrogen in the head end chamber 34 acts on the piston assembly 46 in a known manner to cushion movement of the piston assembly 46 upon operation of the press assembly 10. (See U.S. Pat. Nos. 3,457,765 and 4,111,030.)

In accordance with a feature of the present invention, dirt and other contaminants are not drawn into the die cylinder assembly 24 with a flow of air as the piston assembly 46 is retracted into the cylinder housing 40. A rod end chamber 60 (FIGS. 2 and 3) contracts and expands as the piston assembly 46 moves up and down in the cylinder housing 40. If, as the rod end chamber 60 expands, a reduced pressure is created therein, outside air tends to be drawn into the rod end chamber 60. Contaminants can be drawn in with the air and would work their way in between the piston assembly 46 and the cylinder housing 40. This would especially be the case if fluid pressure in the rod end chamber 60 would at any time become less than ambient fluid pressure.

In order to prevent air and contaminants from being drawn into the rod end chamber 60 as it expands, the fluid pressure in the rod end chamber is always maintained at a pressure which is at least as great as ambient fluid pressure. To maintain the fluid pressure in the rod end chamber 60 at least as great as ambient fluid pressure as the rod end chamber expands, a supply of fluid under pressure is maintained in a third chamber 62 in the piston rod 26 when the die cylinder assembly 24 is in the extended condition of FIG. 2. Upon contraction of the die cylinder assembly 24 to the retracted condition of FIG. 3, the rod end chamber 60 expands. As the rod end chamber 60 expands, the fluid in the chamber 62 flows through passages 64 into the expanding rod end chamber 60. The flow of fluid from the chamber 62 in the piston rod 26 to the rod end chamber 60 maintains the fluid in the rod end chamber at a pressure which is at least as great as atmospheric pressure.

The chamber 62 in the piston rod 26 is formed between a cylindrical plug 52 and a check valve assembly 70. A sufficient amount of fluid is sealed in the cylindrical chambers 60 and 62 and the passage 64 in order to maintain the fluid pressure in the rod end chamber 60 at least as great as ambient fluid pressure as the rod end chamber expands. The fluid which is contained in the rod end chamber 60, the third chamber 62, and the passage 64 may be air or any other suitable fluid, and is described herein as being air.

Figure 3:
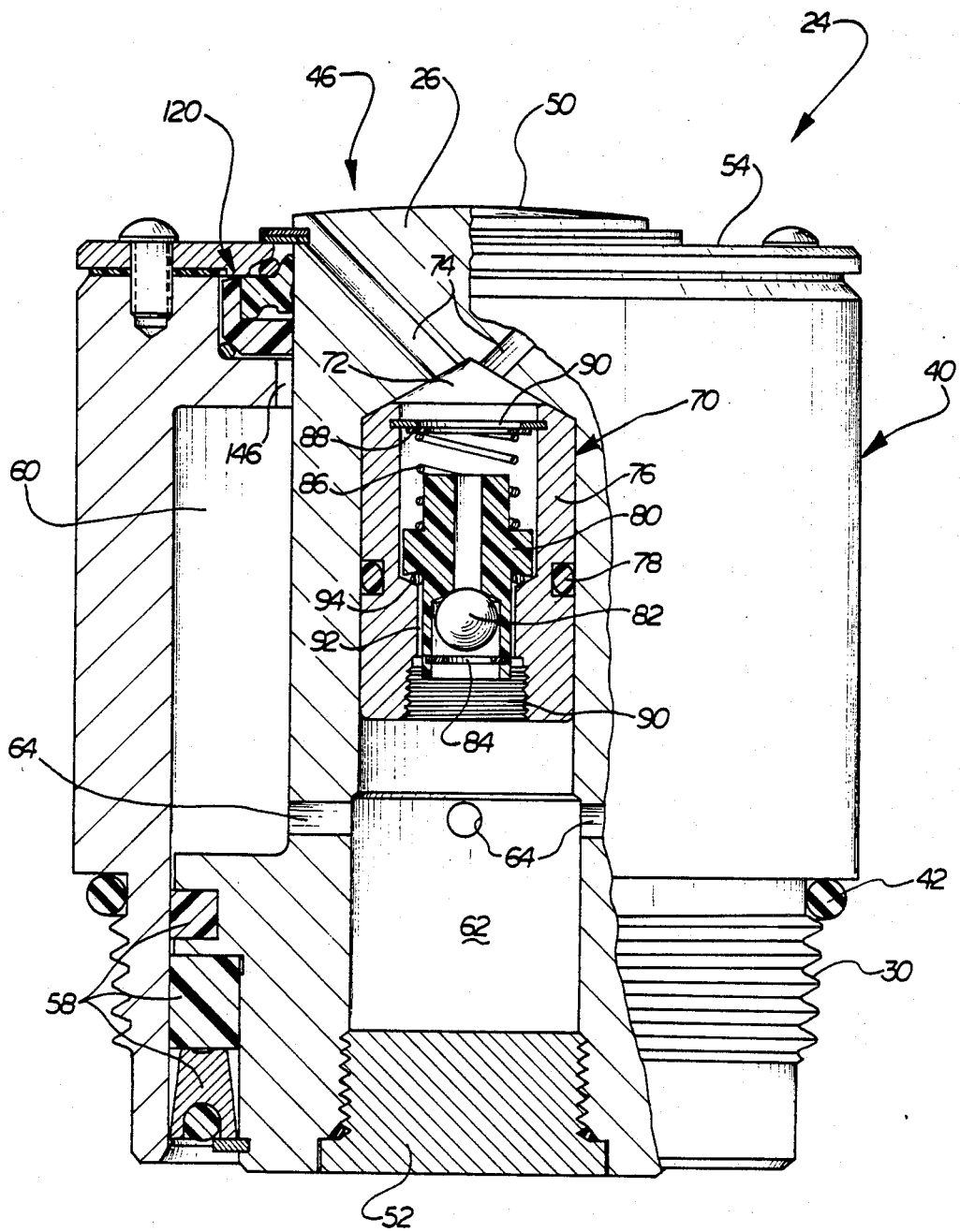
FIG. 3 is an enlarged sectional view, generally similar to FIG. 2, illustrating the piston rod in a retracted position.

When the press 10 is opened by raising the upper die shoe 14, the piston assembly 46 moves from the retracted condition shown in FIG. 3 to the extended condition shown in FIG. 2. As this happens, the rod end chamer 60 contracts and air flows from the rod end chamber 60 through the passage 64 into the third chamber 62. In one specific embodiment of the invention, the fluid pressure in the rod end chamber 60 and the chamber 62 was approximately 22 lbs. per square inch above ambient pressure when the die cylinder assembly 24 was in the extended condition of FIG. 2.

When the press 10 is operated, the piston rod 26 is forced downwardly against the working fluid pressure in the head end chamber 34. In one specific case, the working fluid pressure in the head end chamber 34 was approximately 1,500 lbs. per square inch. The working fluid pressure in the head end chamber 34 is effective to cushion operation of the press 10.

When the piston assembly 46 moves downward and the rod end chamber 60 expands, air flows into the rod end chamber 60 from the chamber 62 in the piston rod 26 through the passages 64. The amount of air present in the chambers 60 and 62 and the passage 64 is sufficient to maintain fluid pressure in the rod end chamber 60 always at least as great as ambient fluid pressure even when the rod end chamber 60 is fully expanded as shown in FIG. 3. This prevents ambient air containing contaminants from being drawn into the rod end chamber 60.

In the specific embodiment of the invention previously referred to, the fluid pressure in the rod end chamber 60 and chamber 62 decreased from 22 lbs. per square inch above ambient pressure to approximately ambient pressure when the die cylinder assembly 24 was actuated from the extended condition of FIG. 2 to the fully retracted condition of FIG. 3. Thus, as the rod end chamber 60 expanded, the fluid pressure in the rod end chamber was maintained at or above ambient pressure at all times to prevent air and contaminants from being drawn into the die cylinder assembly 24.

During most press operations, the die cylinder assembly 24 will not be actuated to the fully retracted condition of FIG. 3. The die cylinder assembly 24 will usually only be actuated to a partially retracted condition in which the piston rod 26 extends further out of the cylinder assembly 24 than is shown in FIG. 3. When the die cylinder assembly 24 is actuated to a partially retracted condition, the fluid pressure in the rod end chamber will be above ambient pressure.

It should be understood that the foregoing specific pressures for the fluid in the rod end chamber 60 and the chamber 62 and for the working fluid have been set forth herein for purposes of clarity of illustration. It is contemplated that other pressures will be used. Of course, the extent of variation in the fluid pressure in the rod end chamber 60 during expansion and contraction of the chamber will depend upon the magnitude of the change in the volume of the rod end chamber. The minimum fluid pressure in the rod end chamber will vary as a function of the extent which the piston is displaced from its fully retracted position.

A die cylinder assembly 24 constructed in accordance with the foregoing features of the present invention has the advantage of being very compact, since the chamber 62 is located within the piston rod 26. The fluid which is present in the chambers 60 and 62 and the passage 64 may be kept at a relatively low pressure. The die cylinder assembly 24 of the present invention is also relatively easy to manufacture, it has no exposed parts, such as flexible boots, which could be easily broken or worn.

It is contemplated that as the die cylinder assembly 24 is used for a long period of time, fluid may leak out of the chamber 60 to the atmosphere. To make up for fluid leakage, the check valve assembly 70 (see FIGS. 2 and 3) admits ambient air to the third chamber 62 if fluid pressure in the third chamber 62 closely approaches ambient fluid pressure. The check valve assembly 70 also prevents air from flowing out of the third chamber 62 to the atmosphere.

The check valve assembly 70 is located in a passage 72 in the piston rod 26 and is connected to the atmosphere via passages 74. When the check valve assembly is operated from the closed condition of FIGS. 2 and 3 to an open condition, the third chamber 62 is connected in communication with ambient air pressure through the check valve assembly 70, by the passages 72 and 74.

The check valve assembly 70 includes a cylindrical housing 76 press-fitted into the piston rod 26. The housing 76 is sealed around its outer surface by an O-ring 78 to prevent fluid flow around the housing 76. A valve body 80 contains a spherical ball 82 which is held in the valve body 80 by a snap ring 84. A spring 86 cooperates with a washer 88 and a snap ring 90 to hold the valve body 80 in place in the valve housing 76. A threaded portion 90 of the valve housing 76 is provided, into which a threaded tool (not shown) may be inserted, in order to remove the press-fitted valve assembly 70 from the piston rod 26.

Whenever fluid pressure in the chamber 62 exceeds ambient pressure by an amount sufficient to overcome the weight of the ball 82, the ball 82 is held up against the valve body 80 (FIG. 2) and seals the third chamber 62. If pressure in the third chamber 62 drops below ambient fluid pressure, the ball 82 drops down to the snap ring 84. Air may then flow through the upper passages 72 and 74, through the valve body 80 and into the chamber 62. When ambient pressure is present in the chamber 62, the light weight ball 82 is held against the valve seat by a film of lubricant on the ball.

The check valve assembly 70 allows makeup air to enter the chambers 60 and 62 to compensate for air which may be lost from these chambers due to fluid leakage during operation of the die cylinder assembly 24. Since the passages 74 extend to the upper surface 50 of the piston rod 26, the makeup air which enters the chambers 62 through the check valve assembly 70 is obtained from a location which is at least slightly above the upper end wall 54 of the cylinder housing 40. This tends to minimize the amount of contaminant particles which are drawn into the chamber 62 with the makeup air. Since the makeup air enters the chamber 62 at a relatively low velocity, any stray particles which are conducted through check valve assembly 70 will tend to settle in the chamber 62 without flowing into the rod end chamber 60 where they may be detrimental to the piston seals 58.

During operation of the die cylinder assembly 24, the high pressure working fluid may leak past the piston seals 58. This could result in an excessive fluid pressure in the rod end chamber 60. To prevent this from happening the check valve assembly 70 (FIGS. 2 and 3) also functions as a pressure relief valve for the chambers 60 and 62. A spring 86 applies a certain downward force to the valve body 80. If fluid pressure in the third chamber 62 should become great enough to exceed the force applied by the spring 86, the valve body 80 will be forced upward against the spring 86. The fluid (air) will then flow out of the third chamber 62 through a cylindrical passage 92 (shown enlarged for clarity) around the valve body 80, past the O-ring 94, and to the atmosphere through the passages 72 and 74.

As soon as the fluid pressure in the third chamber 62 falls to a value at which it balances the downward force of the spring 86, the valve body 80 will be forced downward, sealing with the O-ring 94 against the valve housing 76. The third chamber 62 will thus be sealed at a pressure at least as great as ambient fluid pressure. The strength of the spring 86 is chosen according to the maximum fluid pressure which is to be maintained in the third chamber 62. In one specific instance the spring 86 allows the relief valve body 80 to open when the fluid pressure in the chamber 62 exceeds atmospheric pressure by 92 lbs. per square inch. Of course, other maximum pressures could be selected if desired.

Figure 4:
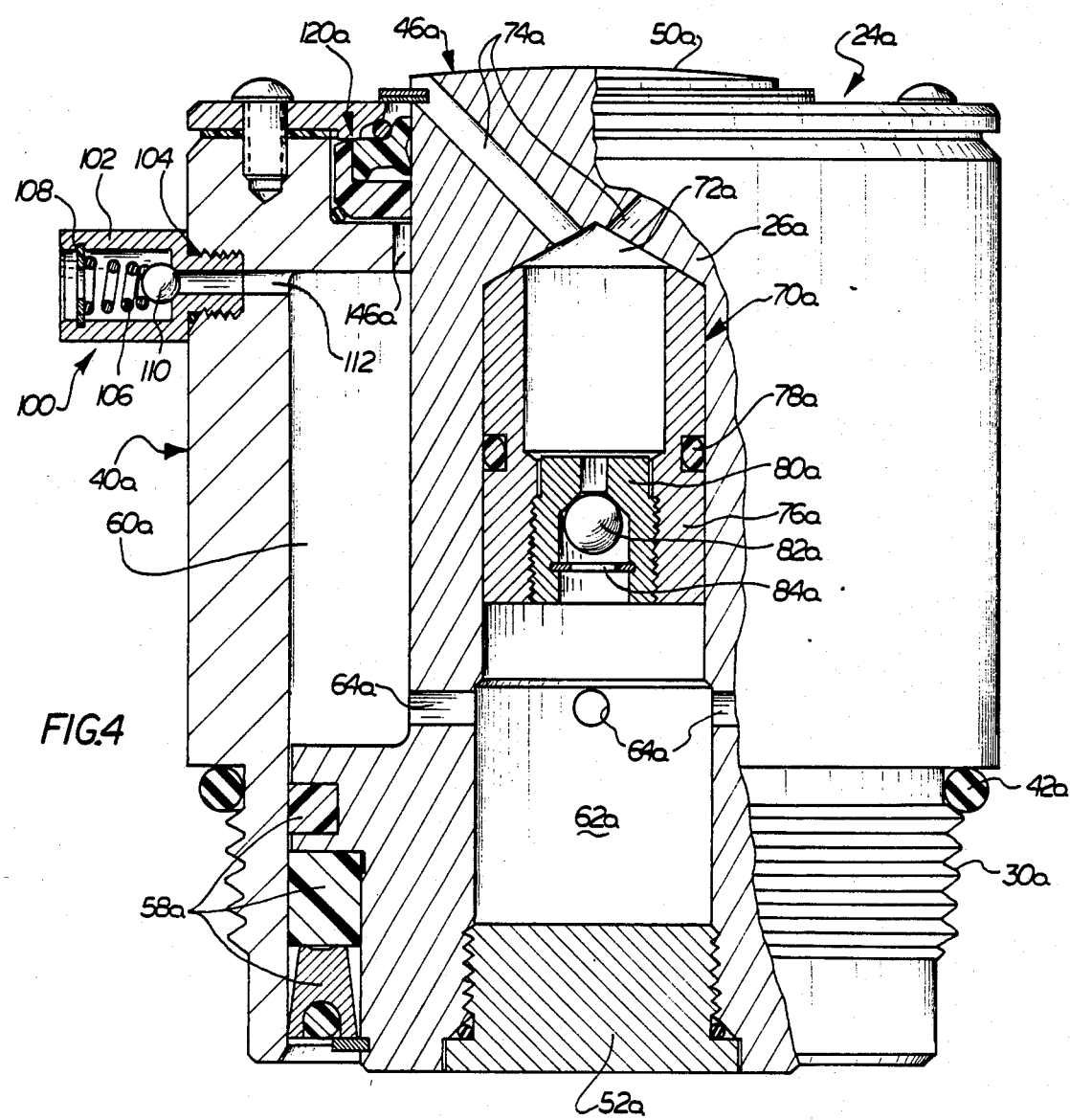
FIG. 4 is an enlarged sectional view, generally similar to FIG. 3, illustrating an embodiment of the invention in which a pressure relief valve is mounted on a cylinder wall.

In the embodiment of the invention shown in FIGS. 1–3, the pressure relief valve assembly is built into the piston rod 26. It is contemplated that it may be desirable to locate the pressure relief valve assembly at a different location. Accordingly, FIG. 4 illustrates a die cylinder assembly in which the relief valve assembly has been mounted on the side wall of the cylinder rather than in the piston. Since components of the embodiment of the invention illustrated in FIG. 4 are generally similar to the components of the embodiment of the invention illustrated in FIGS. 1–3, similar numerals will be utilized to designate similar components with the suffix letter "a" being associated with the numerals designating components of the embodiment of the invention shown in FIG. 4 to avoid confusion.

A die cylinder assembly 24a includes a check valve assembly 70a. The valve body 80a is threaded directly into the valve housing 76a, and has a ball 82a and a snap ring 84a. The check valve assembly 70a shown in FIG. 4 functions in a manner similar to that of the check valve assembly 70 shown in FIGS. 2 and 3. Although the check valve assembly 70a as illustrated in FIG. 4 does not include threads 90 (see FIG. 3) for removing the press fitted valve assembly 70a from the piston rod 26, such threads may be added to the valve assembly 70a shown in FIG. 4.

The die cylinder assembly 24a of FIG. 4 also includes a relief valve 100 which operates to vent the rod end chamber 60a and thereby the chamber 62a in the piston rod 26a if the fluid pressure therein should exceed a predetermined value. The relief valve 100 includes a valve housing 102 threadedly mounted in the cylinder housing 40a and sealed with an O-ring 104. A spring 106 and a snap ring 108 cooperate with a ball 110 to vent the air from the rod end chamber 60a through the passage 112 in the cylinder body 40a, whenever the fluid pressure in the rod end chamber 60a exceeds the predetermined amount.

Figure 5:
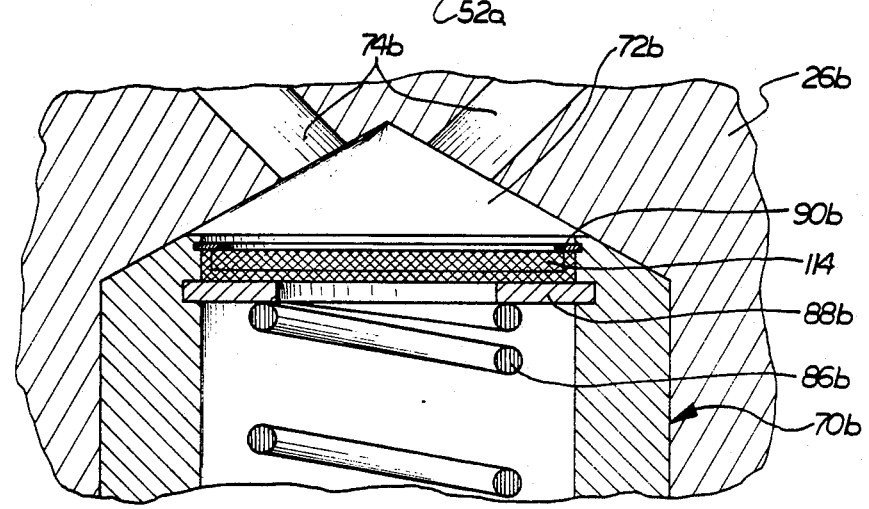
FIG. 5 is an enlarged fragmentary sectional view of a portion of a piston rod and illustrating an embodiment of the invention in which a filter is located in the piston rod.

Although the passages 74 (FIG. 2) extend to the upper end of the piston rod 26 so that any makeup air which enters the chamber 62 will be relatively free of contaminants, it is contemplated that it may be desirable to provide a filter in association with the makeup air passages. An embodiment of the invention having such a filter is disclosed in FIG. 5. Since the embodiment of the invention shown in FIG. 5 is generally similar to the embodiment of the invention shown in FIGS. 1–3, similar numerals will be utilized to designate similar components, the suffix letter "b" being associated with the embodiment of the invention shown in FIG. 5 in order to avoid confusion.

A circular filter 114 (FIG. 5) is disposed in the passage 72b in conjunction with the check valve assembly 70b. The filter 114 shown in FIG. 5 is disposed between the washer 88b and a snap ring 90b. The filter 114 prevents dirt and other contaminants from entering the chamber 62b. It is contemplated that a filter 114, or another type of filter, may be used with either embodiment of the check valve assembly 70 shown in FIG. 3 or FIG. 4.

In operation of the press 10, the force which is applied to the piston rod 26 may be offset slightly from the central axis of the piston rod. This results in the application of a moment to the piston rod 26 tending to tilt the piston rod relative to the central axis of the cylinder housing 40. Although the angle to which the cylinder rod is tilted is relatively small, approximately ½ of a degree or less under most operating conditions, this tilting movement of the piston rod must be accommodated or leakage will tend to develop between the piston rod and the cylinder housing.

In accordance with a feature of the present invention, a seal assembly 120 (FIG. 6) is provided to accommodate tilting movement of the piston rod 26. Thus, the seal assembly 120 maintains a fluid tight seal between the piston rod 26 and cylinder housing 40 upon tilting movement of the piston rod from the normal or initial position shown in FIG. 6 to either a leftward (as viewed in FIG. 6) tilted position (FIG. 7) or a rightward tilted position (FIG. 8).

The seal assembly 120 is disposed in an annular chamber 122 (see FIG. 6) at the rod end portion of the cylinder 40. The annular chamber 122 circumscribes the piston rod 26 and has an annular bottom side wall 124. A cylindrical outer side wall 126 extends upwardly (as viewed in FIG. 6) from the bottom side wall 124 to the end wall 54 of the cylinder housing 40.

The seal assembly 120 includes a rigid annular base or bearing member 130 which is disposed in the chamber 122. The annular base or bearing member 130 has an annular lower surface 134 which extends generally parallel to the bottom surface 124 of the annular cavity 122 when the piston rod 26 is in the normal or untilted position shown in FIG. 6. In addition, at this time, a cylindrical outer side surface 136 of the base member extends generally parallel to the cylindrical side surface 126 of the seal chamber 122.

In order to provide for a fluid tight seal between the bearing member 130 and the cylinder body 40, an annular 0-ring 140 is provided between a conical corner surface 142 of the bearing member 130 and an annular corner formed between the two side surfaces 124 and 126 of the seal chamber 122. The annular seal ring 140 and the bearing member 130 cooperate to block fluid flow along a path extending between the outer side surface 134 of the seal member and the side surface 124 of the chamber 122. The seal ring 140 is pressed against both the sidewalls 124 and 126 of the chamber 122 by the bearing member 130 and by fluid pressure. This fluid pressure is conducted from the rod end chamber 60 (FIG. 2) to the seal chamber 122 through a small annular clearance space between the piston rod 26 and bearing 130. This annular clearance space may be approximately 0.0025 inches wide.

A flexible rod seal ring 148 is disposed in an annular chamber 150 formed in the rigid base member 130. The rod seal ring 148 sealingly engages a cylindrical outer side surface 152 on the piston rod 26. In addition, the rod seal ring 148 sealingly engages both an annular bottom side surface 154 and a cylindrical outer side surface 156 of the chamber 150 formed in the base member 130. Therefore, the rod seal ring 148 blocks fluid leakage between the outer side surface of the piston rod 26 and the base member 130.

In order to be certain of a positive seal between the rod seal ring 148 and the piston rod 26, the rod seal ring 148 sealingly engages the piston 26 at two axially spaced locations. Thus, the rod seal ring 148 has a downwardly projecting annular lip 162 with an outer side surface 164 which sealingly engages the piston rod 26. The rod seal ring 148 also has an upwardly projecting annular lip 168 with an outer side surface 170 which sealingly engages the piston rod 26 above the area where the lower lip 162 seals against the piston rod.

A radially outer annular lip 174 on the rod seal ring 148 sealingly engages both the lower side surface 154 and the upwardly extending outer side surface 156 of the chamber 150. A second seal is also provided between the ring 148 and the rigid seal member 130 by engagement of the circular outer side surface area 176 of a body portion 178 of the seal ring 148 with the upwardly extending cylindrical side surface 156 of the chamber 150.

A third annular seal member or 0-ring 184 sealingly engages side surface area on the rod seal ring 148 and a radially outwardly and axially inwardly sloping cam surface 190 formed on the end wall 54. The end wall 54 has a cylindrical side surface 192 which circumscribes the piston rod 26 and is disposed in a coaxial relationship with the piston rod when the piston rod is in the untilted position shown in FIG. 6. The seal ring 184 prevents dirt and other contaminants from entering the chamber 192 at the space between the cam surface 190 and the rod seal ring 148.

Figure 6:
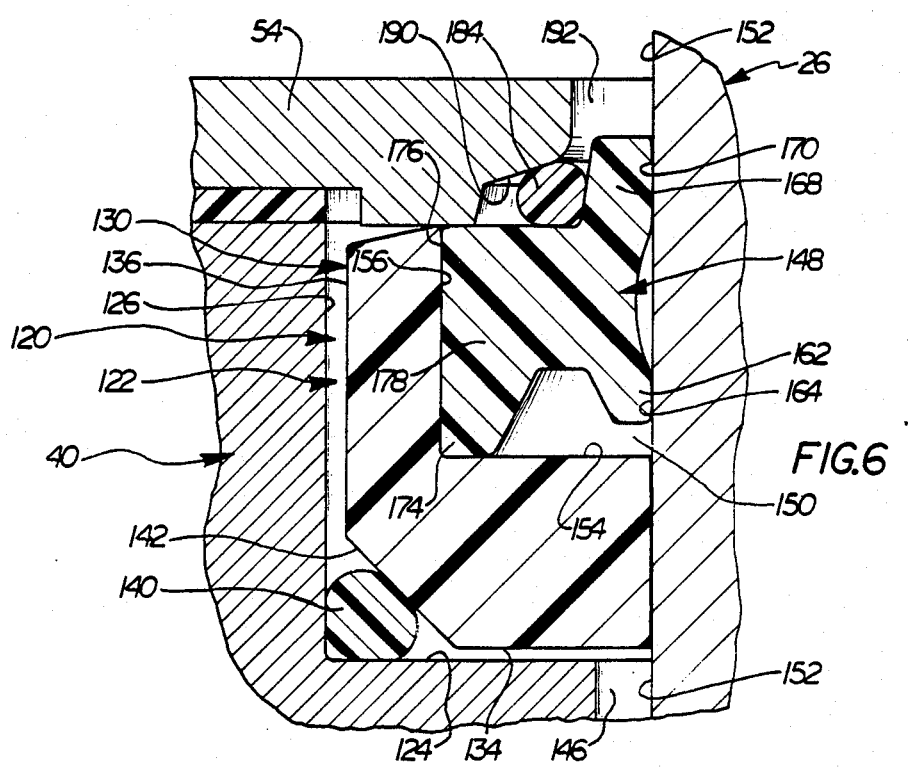
FIG. 6 (on sheet 1 of the drawings) is an enlarged fragmentary sectional view illustrating a seal constructed in accordance with a feature of the present invention.
Figure 7:
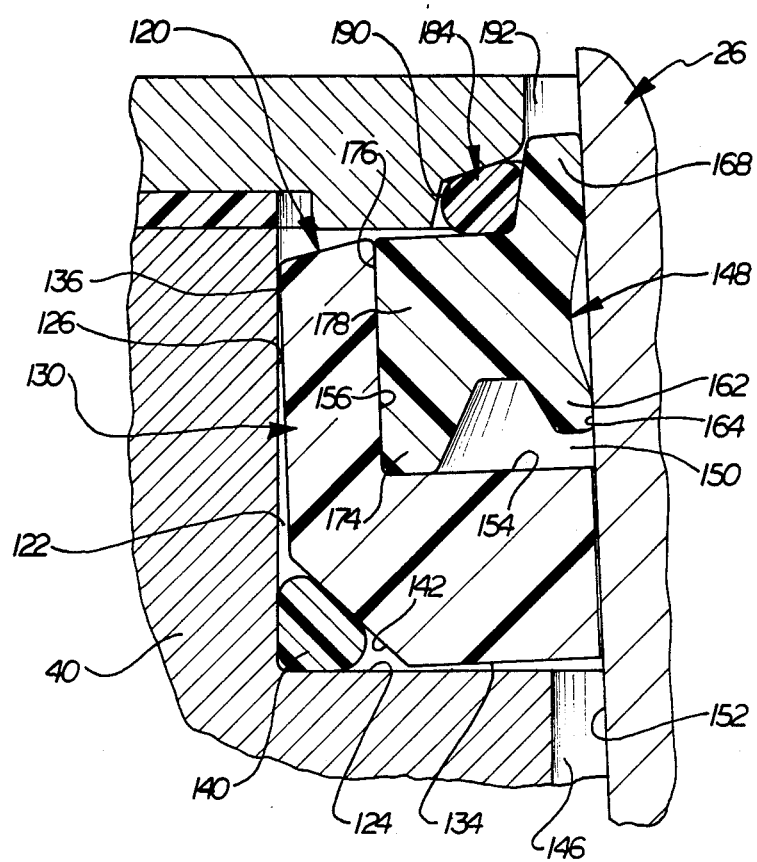
FIG. 7 is an enlarged sectional view, generally similar to FIG. 6, illustrating the seal with the piston rod tilted in one direction.
Figure 8:
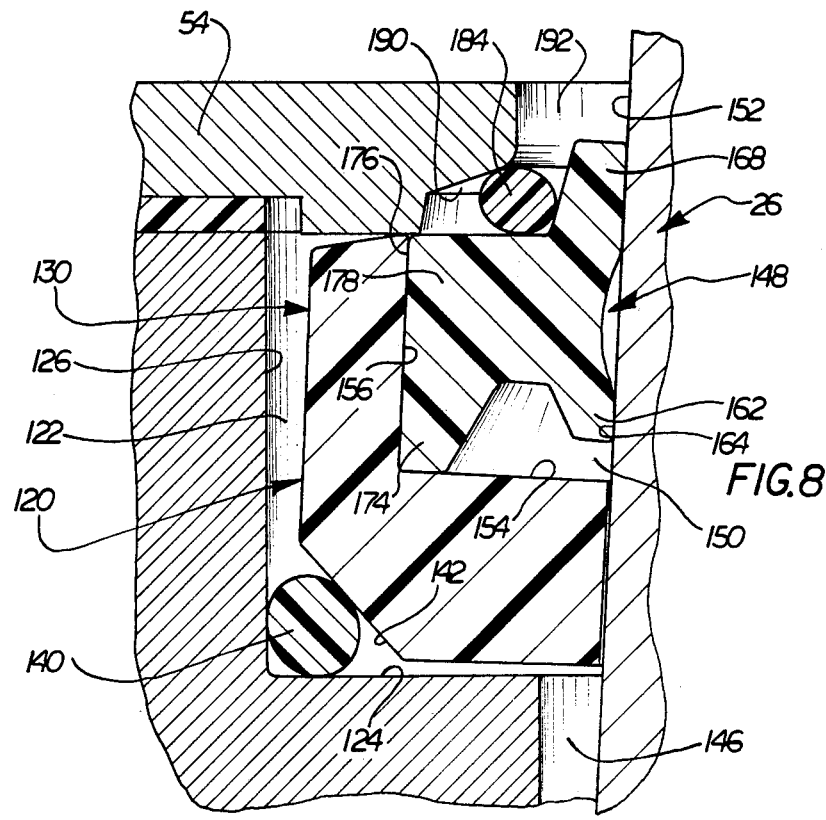
FIG. 8 is an enlarged sectional view generally similar to FIG. 6 and illustrating the seal of FIG. 6 with the piston rod tilted in another direction.

When the force applied to the piston rod 26 is offset to the left (as viewed in FIG. 6) of the central axis of the piston rod, the force moves the piston rod from the initial position shown in FIG. 6 to the leftward tilted or skewed position shown in FIG. 7. Upon leftward tilting movement of the piston rod 26, the annular rod seal ring 148 is moved toward the left (as viewed in FIG. 7). This maintains the sealing engagement between the outer side surface 152 of the piston rod 26 and the upwardly and downwardly projecting lips 162 and 168 of the seal ring 148. In addition, the radially outer lip 174 of the seal ring 148 is maintained in flat sealing engagement with the inner side surface 156 of the bearing member 130. Therefore, a fluid tight seal is maintained between the rod seal ring 148, the piston rod 26 and the bearing member 130 when the piston rod is in the skewed or tilted position shown in FIG. 7.

The leftward force applied against the bearing member 130 by the tilting piston rod 26 causes the bearing member to slide radially outwardly (as viewed in FIG. 7) and axially downwardly (as viewed in FIG. 7) along an arcuate path. This radially outwardly and axially inward movement of the bearing member 130 forces it into firm sealing engagement with the 0-ring 140 to block any fluid leakage between the lower side surface 134 of the base member 130 and the annular bottom surface 124 of the seal chamber 122. At this time the cylindrical outer side surface 136 of the base member 130 is skewed relative to and spaced from the cylindrical side surface 126 of the chamber 122 so that the forces applied against the seal assembly 120 do not crush the components of the seal assembly but merely resiliently deform them.

In accordance with a feature of the present invention, the bearing member 130 moves with the piston rod 26 as the piston rod is tilted. This results in the central axes of the bearing member 130 and rod seal 148 remaining coincident with the central axis of the piston rod 26 as the piston rod is tilted. Thus, when the piston rod is in the initial position of FIG. 6, the central axes of the cylinder housing 40, seal chamber 122, piston rod 26, bearing member 130 and piston rod seal 148 are all coincident. Upon leftward tilting movement of the piston rod 26, the coincident central axes of the piston rod, bearing member 130 and rod seal 148 are all skewed at the same angle relative to the coincident central axes of the cylinder housing 40 and seal chamber 122.

If the piston rod 26 was allowed to tilt relative to the bearing member 130 and rod seal 148, the rod seal and bearing member would tend to wear excessively at locations where the piston rod 26 pressed against the rod seal and bearing member. This would eventually result in an ovalizing of the seal openings through which the piston rod extends with a loss of seal effectiveness. Thus, the operating life of the seal assembly 120 is promoted by maintaining the angular orientation of the bearing member 130 and rod seal 148 relative to the outer side surface 152 of the piston rod 26 constant as the piston rod is tilted relatilve to the cylinder housing 40.

As the piston rod 26 is tilted and the bearing member 130 is moved radially outwardly and axially inwardly along an arcuate path to the orientation shown in FIG. 7, the seal ring 184 moves along the cam surface 190. The cam surface 190 forces the seal ring 184 axially inwardly against the rod seal 148. This provides a fluid tight seal between the bearing ring 184 and both the cam surface 190 and rod seal 148. In addition, the force applied against the seal ring 184 by the cam surface 190 is transmitted to the bearing member 130 to force the bearing member axially inwardly as it moves radially outwardly (as viewed in FIG. 7) with the piston rod 26.

When the load is removed from the piston rod 26, it will tend to return back to the normal position shown in FIG. 6. As this occurs, the bearing member 130 is forced radially inwardly, that is toward the right as viewed in FIG. 7, and axially upwardly by the seal ring 140. As the bearing member 130 and piston rod 26 move from the leftward tilted position of FIG. 7 to the initial position of FIG. 6, the seal ring 184 moves radially inwardly and axially outwardly along the cam surface 190.

If the force applied to the piston rod 26 is offset toward the right (as viewed in FIG. 6), the piston rod tends to be skewed rightwardly from the initial position shown in FIG. 6 to the tilted position shown in FIG. 8. As the piston rod 26 moves to the rightwardly tilted position of FIG. 8, the force applied against the piston rod surface 152 by the rod seal ring 148 is maintained. Therefore, the annular lower and upper seal lips 162 and 168 maintain their tight sealing engagement with the outer cylindrical side surface 152 of the piston rod 26.

As the piston rod 26 tilts to the position shown in FIG. 8, the seal rings 140 and piston rod 26 cause the bearing member 130 to move radially inwardly and axially outwardly along an arcuate path. As this occurs, the upper ring member 184 slides radially inwardly and axially outwardly along the cam surface 190. Therefore, the bearing member 130 is free to move axially outwardly as viewed in FIG. 8.

As the bearing member 130 moves outwardly, the seal member 140 expands to maintain a tight seal against the corner surface 142 on the bearing member. The fluid pressure applied against the seal ring 140 wedges it firmly between the base member 130 and side surfaces 124 and 126 of the seal chamber 122. In addition, the seal ring 184 maintains a tight seal with both the rod seal ring 148 and the cam surface 190 to prevent dirt and other contaminants from entering the seal chamber 122. If the seal chamber 122 ever became filled with contaminants, the bearing member 130 could not move in the manner previously explained.

Fluid flow around the inner side surfaces 154 and 156 of the bearing member 130 are blocked by the rod seal ring 148. Thus, the inner lip 174 on the rod seal ring 148 seals against the inner corner of the base member 130. The body section 178 of the rod seal ring 148 also seals against the side surface 156 of the base member 130.

It should be understood that only a portion of the components of the seal assembly 120 have been shown in FIGS. 6–8 and that when the piston rod 26 is skewed as shown in FIG. 7, the relationship between the diametrically opposite portion of the seal assembly 120 and the piston rod is similar to that shown in FIG. 8. When the piston rod 26 is tilted as shown in FIG. 8, the components of the seal assembly 120 directly opposite from that shown in FIG. 8 will be in a condition similar to that shown in FIG. 7.

In view of the foregoing description it is apparent that the present invention provides an improved die cylinder assembly 24 having a variable volume rod end chamber 60 wherein pressure is always maintained at least as great as ambient fluid pressure by an interconnection with a third chamber 62 which is located within the piston rod 26 itself. When the piston retracts, thereby expanding the rod end chamber 60, fluid at greater than ambient pressure flows from the third chamber 62 through the passage 64 into the rod end chamber 60. This maintains fluid pressure in the rod end chamber 60 always at least as great as ambient fluid pressure, thus blocking contaminants from being drawn in between the piston rod 26 and the cylinder housing 40. The die cylinder assembly 24 of the present invention is both compact and durable, and any wear from contaminants being drawn in is lessened.

An improved seal assembly 120 is further provided to seal between the piston rod 26 and the cylinder housing 40. The seal assembly 120 includes a bearing member 130 and rod seal ring 148 having central axes which are maintained in alignment with the central axis of the piston rod 26 as it is moved between the initial position of FIG. 6 and the tilted positions of FIGS. 7 and 8. By maintaining angular orientation of the bearing member 130 and rod seal ring 148 constant relative to the piston rod 26 as the piston rod tilts, the operating life of the seal assembly 120 is enhanced.

Specific preferred embodiments having been described, what is claimed is:

1. An apparatus to cushion movement of a member in a press or the like in an environment which is contaminated by materials which are detrimental to operation of the apparatus, said apparatus comprising cylinder means for at least partially defining a cylinder chamber, said cylinder means including an end wall and a sidewall, piston means for dividing the cylinder chamber into a rod end variable volume chamber and a head end variable volume chamber and for blocking fluid communication between the rod end variable volume chamber and the head end variable volume chamber, a rigid piston rod connected with said piston means and extending through the end wall of said cylinder means, said piston means and said cylinder means being movable relative to each other under the influence of a relatively high working fluid pressure in the head end variable volume chamber to expand the head end variable volume chamber and contract the rod end variable volume chamber, said piston means and said cylinder means being movable relative to each other under the influence of forces applied to said piston rod and said cylinder means to expand the rod end variable volume chamber and contract the head end variable volume chamber and thereby cushion movement of the member in the press, and means for maintaining the fluid pressure in the rod end variable volume chamber at least as great as ambient fluid pressure during expansion of the rod end variable volume chamber to prevent a flow of materials detrimental to the operation of the apparatus into the rod end variable volume chamber from the environment around said apparatus upon expansion of the rod end variable volume chamber, said means for maintaining the fluid pressure in said rod end variable volume chamber including surface means at least partially defining a third chamber disposed in said piston rod and separate from said head end variable volume chamber for storing a quiescent body of fluid under pressure prior to expansion of said rod end variable volume chamber and port means for conducting a flow of fluid from said third chamber in said piston rod into said rod end variable volume chamber upon expansion of said rod end variable volume chamber and for conducting a flow of fluid from said rod end variable volume chamber into said third chamber in said piston rod upon contraction of said rod end variable chamber to maintain the same body of fluid in said rod end variable volume chamber and third chamber in said piston rod during repeated expansion and contraction of said rod end variable volume chamber, said piston means including means for blocking fluid flow from said head end variable volume chamber into said third chamber during expansion and contraction of said rod end variable volume chamber.

2. An apparatus as set forth in claim 1 wherein the third chamber is at least partially disposed in said piston means.

3. An apparatus as set forth in claim 1 wherein said piston rod includes end surface means for receiving forces to move said piston rod from a first position to a second position against the influence of the working fluid pressure, said piston rod including passage means extending between said end surface means and the third chamber for connecting said end surface means and the third chamber in fluid communication with ambient fluid pressure.

4. An apparatus as set forth in claim 1 further including relief valve means in said cylinder means for venting the third chamber when the fluid pressure in the third chamber exceeds ambient fluid pressure by a predetermined amount.

5. An apparatus as set forth in claim 1 wherein said piston rod is movable between a first position in which a central axis of said piston rod is aligned with a central axis of said cylinder means and any one of a plurality of tilted positions in which the central axis of said piston rod is skewed relative to the central axis of said cylinder means, said apparatus further including seal means for blocking fluid flow between said cylinder means and said piston rod upon movement of said piston rod between said first position and one of said tilted positions, said seal means including annular seal chamber means formed in said cylinder means and circumscribing said piston rod, said annular seal chamber means including a rigid sidewall, a rigid bearing ring circumscribing said piston rod and movable therewith relative to said sidewall upon movement of said piston rod from the first position to any one of said plurality of tilted positions, said bearing ring having an annular side surface which is spaced from said sidewall by a first distance when said piston rod is in the first position, is spaced from said sidewall by a second distance which is smaller than the first distance when said piston rod is in a first tilted position, and is spaced from said sidewall by a third distance which is larger than the first distance when said piston rod is in a second tilted position, said seal means further including a flexible annular seal member disposed between said rigid bearing ring and said sidewall for blocking fluid flow between said seal ring and said sidewall when said piston rod is in said first position and when said piston rod is in any one of said plurality of tilted positions.

6. An apparatus as set forth in claim 1 wherein said port means extends through said piston rod and connects the third chamber in said piston rod and the rod end variable volume chamber in fluid communication at a location adjacent to said piston means.

7. An apparatus to cushion movement of a member in a press or the like in an environment which is contaminated by materials which are detrimental to operation of the apparatus, said apparatus comprising cylinder means for at least partially defining a cylinder chamber and an annular seal chamber, a piston rod at least partially disposed in the cylinder chamber, said piston rod being movable between an initaial position in which a central axis of said piston rod is aligned with a central axis of said cylinder means and a first tilted position in which the central axis of said piston rod is skewed relative to the central axis of said cylinder means, an annular seal assembly disposed in said seal chamber and circumscribing said piston rod for blocking fluid flow between said piston rod and said cylinder means, said seal assembly including annular cylinder seal means disposed in said seal chamber in sealing engagement with a side surface of said seal chamber and annular rod seal means disposed in said seal chamber in sealing engagement with said piston rod and said cylinder seal means, said rod seal means having a central axis which is aligned with the central axis of said piston rod when said piston rod is in the initial position, said rod seal means being radially and axially movable relative to said cylinder means along an arcuate path upon movement of said piston rod to the first tilted position, said rod seal means being in sealing engagement with said cylinder seal means and being aligned with the central axis of said piston rod during movement of said piston rod from the initial position to the first tilted position, and annular cam surface means fixedly connected with said cylinder means and circumscribing said piston rod for forcing said rod seal means to move in an axially inward direction toward said cylinder chamber upon movement of said piston rod from the initial position to the first tilted position, said cam surface means sloping relative to said piston rod in a radially outward and axially inward direction.

8. An apparatus as set forth in claim 7 further including piston means for dividing the cylinder chamber into a head end chamber and a rod end chamber through which said piston rod extends, said piston rod including surface means for at least partially defining a third chamber in said piston rod and for at least partially defining a passage extending through said piston rod and connecting the third chamber and the rod end chamber in fluid communication.

9. An apparatus as set forth in claim 7 wherein said piston rod is movable relative to said cylinder means to a second tilted position in which the central axis of said piston rod is skewed relative to the central axis of said cylinder means, said rod seal means including a bearing ring circumscribing said piston rod and movable therewith relative to said cylinder means upon movement of said piston rod from the initial position to the first tilted position, said bearing ring having an annular side surface which is generally parallel to the side surface of said seal chamber when said piston rod is in the initial position, is skewed in a first direction relative to the side surface of said seal chamber when said piston rod is in the first tilted position and is skewed in a second direction relative to the side surface of said seal chamber when said piston rod is in the second tilted position.

10. An apparatus to cushion movement of a member in a press or the like, said apparatus comprising cylinder means for at least partially defining a cylinder chamber and an annular seal chamber, said seal chamber having a cylindrical side wall which is disposed in a coaxial relationship with a central axis of said cylinder means, a piston rod at least partially disposed in the cylinder chamber, said piston rod being tiltable through a range of movement between an initial position in which a central axis of said piston rod is aligned with the central axis of said cylinder means, a first tilted position in which the central axis of said piston rod is skewed in a first direction relative to the central axis of said cylinder means and a second tilted position in which the central axis of said piston rod is skewed relative to the central axis of said cylinder means in a second direction opposite to the first direction, and an annular seal assembly disposed in said seal chamber and circumscribing said piston rod for blocking fluid flow between said piston rod and said cylinder means when said piston rod is in any position within its range of tilting movement, said seal assembly including a rigid bearing ring circumscribing said piston rod, said bearing ring having a radially inner section which is disposed in engagement with said piston rod and a radially outer section which is disposed adjacent to and is spaced from said cylindrical side wall of said seal chamber when said piston rod is in the initial position, said bearing ring having an annular outer side surface area which is skewed at an acute angle to the cylindrical side wall of said seal chamber and which cooperates with the cylindrical side wall of said seal chamber to form an annular gap which tapers axially from a relatively wide end portion to a relatively narrow end portion in a direction away from said cylinder chamber and which varies in cross sectional configuration with movement of said piston rod between said first and second tilted positions, said bearing ring having inner side surfaces which at least partially define an annular bearing ring chamber which circumscribes and opens radially inwardly toward said piston rod, an annular rod seal ring disposed in said bearing ring chamber, said rod seal ring having a radially inner portion disposed in sealing engagement with said piston rod and a radially outer portion disposed in sealing engagement with an inner side surface of said bearing ring, an annular bearing ring seal disposed in said annular gap in sealing engagement with said annular outer side surface area of said bearing ring and the cylindrical side wall of said seal chamber throughout the range of tilting movement of said piston rod, and means for conducting fluid pressure from said rod end variable volume chamber to a radially inner portion of said bearing seal ring to press said bearing seal ring toward the reltively narrow end portion of the gap to maintain sealing engagement of said bearing seal ring with the cylindrical side wall of said seal chamber and with the outer side surface of said bearing ring.

11. An apparatus as set forth in claim 10 wherein said cylinder means includes an annular section which extends radially inwardly from the cylindrical side wall of said seal chamber, said seal assembly including an annular secondary seal ring disposed in sealing enagagment with said rod seal ring and said annular section of said cylinder means.

12. An apparatus as set forth in claim 11 wherein said annular section of said cylinder means includes cam surface means for pressing said secondary seal ring inwardly against said rod seal ring upon tilting movement of said piston rod.

13. An apparatus to cushion movment of a member in a press or the like in an environment which is contaminated by materials which are detrimental to operation of the apparatus, said apparatus comprising cylinder means for at least partially defining a cylinder chamber, said cylinder means including an end wall and a sidewall, piston means for dividing the cylinder chamber into a rod end variable volume chamber and a head end variable volume chamber and for blocking fluid communication between the rod end variable volume chamber and the head end variable volume chamber, a rigid piston rod connected with said piston means and extending through the end wall of said cylinder means to an axally outer end portion of said piston rod, said piston means and said cylinder means being movable relative to each other under the influence of a relatively high working fluid pressure in the head end variable volume chamber to expand the head end variable volume chamber and contract the rod end variable volume chamber, said piston means and said cylinder means being movable relative to each other under the influence of forces applied to said piston rod and said cylinder means to expand the rod end variable volume chamber and contract the head end variable volume chamber, said outer end portion of said piston rod being disposed outside of said cylinder means and being at least partially exposed to ambient fluid pressure when said rod end variable volume chamber is fully expanded, said piston rod including an internal passage having a first port which is constantly exposed to the fluid pressure in said rod end variable volume chamber and a second port which is disposed in the outer end portion of said piston rod and is constantly exposed to ambient fluid pressure, and check valve means disposed within said piston rod for blocking fluid flow through said passage when the fluid pressure in said rod end variable volume chamber exceeds ambient fluid pressure and for enabling fluid to flow from the outer end portion of said piston rod through said passage to said rod end variable volume chamber when the fluid pressure in said rod end variable volume chamber is less than ambient fluid pressure.

14. An apparatus as set forth in claim 13 further including relief valve means in said piston rod for venting fluid flow from said rod end variable volume chamber to atmosphere through said passage when the fluid pressure in said rod end variable volume chamber exceeds a predetermined fluid pressure.

15. An apparatus to cushion movement of a member in a press or the like in an environment which is contaminated by materials which are detrimental to operation of the apparatus, said apparatus comprising cylinder means for at least partially defining a cylinder chamber, said cylinder means including an end wall and a sidewall, piston means for dividing the cylinder chamber into a rod end variable volume chamber and a head end variable volume chamber and for blocking fluid communication between the rod end variable volume chamber and the head end variable volume chamber, a rigid piston rod connected with said piston means and extending through the end wall of said cylinder means, said piston means and said cylinder means being movable relative to each other under the influence of a relatively high working fluid pressure in the head end variable volume chamber to expand the head end variable volume chamber and contract the rod end variable volume chamber, said piston means and said cylinder means being movable relative to each other under the influence of forces applied to said piston rod and said cylinder means to expand the rod end variable volume chamber and contract the head end variable volume chamber, said piston means and piston rod including surface means for defining a bore extending from an opening in a head end side surface of said piston means through said piston means into said piston rod, first passage means for connecting said bore in fluid communication with said rod end variable volume chamber, and means disposed in said bore for blocking fluid communication between said head and rod end variable volume chamber through said bore, said first passage means conducting fluid pressure from said bore to said rod end variable volume chamber upon expansion of said rod end variable volume chamber, said first passage means conducting fluid pressure from said rod end variable volume chamber to said bore upon contraction of said rod end variable volume chamber.

16. An apparatus as set forth in claim 15 further including second passage means extending from an end portion of said bore to an outer end portion of said piston rod, said outer end portion of said piston rod being exposed to ambient fluid pressure when said rod end variable volume chamber is in a fully expanded condition, and check valve means for blocking fluid flow through said second passage means to at least a portion of said bore when the fluid pressure in said rod end variable volume chamber exceeds ambient fluid pressure and for conducting fluid flow from said second passage means to said portion of said bore when the fluid pressure in said rod end variable volume chamber is less than ambient fluid pressure.

17. An apparatus to cushion movement of a member in a press or the like in an environment which is contaminated by materials which are detrimental to operation of the apparatus, said apparatus comprising cylinder means for at least partially defining a cylinder chamber, said cylinder means including an end wall and a sidewall, piston means for dividing the cylinder chamber into a rod end variable volume chamber and a head end variable volume chamber and for blocking fluid communication between the rod end variable volume chamber and the head end variable volume chamber, a rigid piston rod connected with said piston means and extending through the end wall of said cylinder means, said piston means and said cylinder means being movable relative to each other under the influence of a relatively high working fluid pressure in the head end variable volume chamber to expand the head end variable volume chamber and contract the rod end variable volume chamber, said piston means and said cylinder means being movable relative to each other under the influence of forces applied to said piston rod and said cylinder means to expand the rod end variable volume chamber and contract the head end variable volume chamber, said piston rod includes end surface means for receiving forces to move said piston rod from a first position to a second position against the influence of the working fluid pressure, and means for maintaining the fluid pressure in the rod end variable volume chamber at least as great as ambient fluid pressure during expansion of the rod end variable volume chamber to prevent a flow of materials detrimental to the operation of the apparatus into the rod end variable volume chamber form the environment around said apparatus upon expansion of the rod end variable volume chamber, said means for maintaining the fluid pressure in said rod end variable volume chamber including surface means at least partially defining a third chamber in said piston rod for storing a quiescent body of fluid under pressure prior to expansion of said rod end variable volume chamber and port means for conducting a flow of fluid from said third chamber in said piston rod into said rod end variable volume chamber upon expansion of said rod end variable volume chamber and for conducting a flow of fluid from said rod end variable volume chamber into said third chamber in said piston rod upon contraction of said rod end variable volume chamber to maintain the same body of fluid in said rod end variable volume chamber and third chamber in said piston rod during repeated expansion and contraction of said rod end variable volume chamber, said piston rod including passage means extending between said end surface means and the third chamber for connecting said end surface means and the third chamber in fluid communication with ambient fluid pressure, and check valve means for blocking the flow of fluid between said end surface means of said piston rod and the third chamber when the fluid pressure in the third chamber exceeds ambient fluid pressure.

18. An apparatus to cushion movement of a member in a press or the like in an environment which is contaminated by materials which are detrimental to operation of the apparatus, said apparatus comprising cylinder means for at least partially defining a cylinder chamber, said cylinder means including an end wall and a sidewall, said cylinder means includes an annular seal chamber, piston means for dividing the cylinder chamber into a rod end variable volume chamber and a head end variable volume chamber and for blocking fluid communication between the rod end variable volume chamber and the head end variable volume chamber, a rigid piston rod connected with said piston means and extending through the end wall of said cylinder means, said piston means and said cylinder means being movable relative to each other under the influence of a relatively high working fluid pressure in the head end variable volume chamber to expand the head end variable volume chamber and contract the rod end variable volume chamber, said piston means and said cylinder means being movable relative to each other under the influence of forces applied to said piston rod and said cylinder means to expand the rod end variable volume chamber and contract the head end variable volume chamber, said piston rod being movable between an initial position in which a central axis of said piston rod is aligned with a central axis of said cylinder means and a first tilted position in which the central axis of said piston rod is skewed relative to the central axis of said cylinder means, an annular seal assembly disposed in said seal chamber and circumscribing said piston rod for blocking fluid flow between said piston rod and said cylinder means, said seal assembly including annular cylinder seal means disposed in said seal chamber in sealing engagement with a side surface of said seal chamber and annular rod seal means disposed in said seal chamber in sealing engagement with said piston rod and said cylinder seal means, said rod seal means having a central axis which is aligned with the central axis of said piston rod when said piston rod is in the initial position, said rod seal means being radially and axially movable relative to said cylinder means and cylinder seal means along an arcuate path upon movement of said piston rod to the first tilted position, said rod seal means including means for maintaining said rod seal means in sealing engagement with said cylinder seal means and for maintaining the central axis of said rod seal means aligned with the central axis of said piston rod during movement of said piston rod from the initial position to the first tilted position, and means for maintaining the fluid pressure in the rod end variable volume chamber at least as great as ambient fluid pressure during expansion of the rod end variable volume chamber to prevent a flow of materials detrimental to the operation of the apparatus into the rod end variable volume chamber from the environment around said apparatus upon expansion of the rod end variable volume chamber, said means for maintaining the fluid pressure in said rod end variable volume chamber including surface means at least partially defining a third chamber in said piston rod for storing a quiescent body of fluid under pressure prior to expansion of said rod end variable volume chamber and port means for conducting a flow of fluid from said third chamber in said piston rod into said rod end variable volume chamber upon expansion of said rod end variable volume chamber and for conducting a flow of fluid from said rod end variable volume chamber into said third chamber in said piston rod upon contraction of said rod end variable volume chamber to maintain the same body of fluid in said rod end variable volume chamber and third chamber in said piston rod during repeated expansion and contraction of said rod end variable volume chamber.

19. An apparatus as set forth in claim 18 further including annular cam surface means fixedly connected with said cylinder means and circumscribing said piston rod for forcing said rod seal means to move in an axial dirction relative to said cylinder means upon movement of said piston rod from the initial position to the first tilted position.

20. An apparatus to cushion movement of a member in a press or the like in an environment which is contaminated by materials which are detrimental to operation of the apparatus, said apparatus comprising cylinder means for at least partially defining a cylinder chamber, said cylinder means including an end wall and a sidewall, piston means for dividing the cylinder chamber into a rod end variable volume chamber and a head end variable volume chamber and for blocking fluid communication between the rod end variable volume chamber and the head end variable volume chamber, a rigid piston rod connected with said piston means and extending through the end wall of said cylinder means, said piston means and said cylinder means being movable relative to each other under the influence of a relatively high working fluid pressure in the head end variable volume chamber to expand the head end variable volume chamber and contract the rod end variable volume chamber, said piston means and said cylinder means being movable relative to each other under the influence of forces applied to said piston rod and said cylinder means to expand the rod end variable volume chamber and contract the head end variable volume chamber, means for maintaining the fluid pressure in the rod end variable volume chamber at least as great as ambient fluid pressure during expansion of the rod end variable volume chamber to prevent a flow of materials detrimental to the operation of the apparatus into the rod end variable volume chamber from the environment around said apparatus upon expansion of the rod end variable volume chamber, said means for maintaining the fluid pressure in said rod end variable volume chamber including surface means at least partially defining a third chamber in said piston rod for storing a quiescent body of fluid pressure prior to expansion of said rod end variable volume chamber and port means for conducting a flow of fluid from said third chamber in said piston rod into said rod end variable volume chamber upon expansion of said rod end variable volume chamber and for conducting a flow of fluid from said rod end variable volume chamber into said third chamber in said piston rod upon contraction of said rod end variable volume chamber to maintain the same body of fluid in said rod end variable volume chamber and third chamber in said piston rod during repeated expansion and contraction of said rod end variable volume chamber, said piston rod includes surface means defining a passage in said piston rod for connecting the environment around said apparatus in fluid communication with said third chamber in said piston rod, said passage extending between an outer side surface of said piston rod and the third chamber to conduct fluid from the environment around said apparatus to the third chamber in said piston rod when the fluid pressure in the third chamber in said piston rod is less then ambient fluid pressure, and check valve means disposed in said passage for blocking the flow of fluid from the third chamber in said piston rod to the environment around said apparatus when the fluid pressure in the third chamber in said piston rod exceeds ambient fluid pressure.

21. An apparatus as set forth in claim 20 further including filter means disposed in said passage for blocking flow of materials detrimental to operation of the apparatus through said passage.

22. An apparatus to cushion movement of a member in a press or the like in an environment which is contaminated by materials which are detrimental to operation of the apparatus, said apparatus comprising cylinder means for at least partially defining a cylinder chamber, said cylinder means including an end wall and a sidewall, piston means for dividing the cylinder chamber into a rod end variable volume chamber and a head end variable volume chamber and for blocking fluid communication between the rod end variable volume chamber and the head end variable volume chamber, a rigid piston rod connected with said piston means and extending through the end wall of said cylinder means, said piston means and said cylinder means being movable relative to each other under the influence of a relatively high working fluid pressure in the head end variable volume chamber to expand the head end variable volume chamber and contract the rod end variable volume chamber, said piston means and said cylinder means being movable relative to each other under the influence of forces applied to said piston rod and said cylinder means to expand the rod end variable volume chamber and contract the head end variable volume chamber, and means for maintaining the fluid pressure in the rod end variable volume chamber at least as great as ambient fluid pressure during expansion of the rod end variable volume chamber to prevent a flow of materials detrimental to the operation of the apparatus into the rod end variable volume chamber from the environment around said apparatus upon expansion of the rod end variable volume chamber, said means for maintaining the fluid pressure in said rod end variable volume chamber including surface means at least partially defining a third chamber in said piston rod for storing a quiescent body of fluid under pressure prior to expansion of said rod end variable volume chamber and port means for conducting a flow of fluid from said third chamber in said piston rod into said rod end variable volume chamber upon expansion of said rod end variable volume chamber and for conducting a flow of fluid from said rod end variable volume chamber into said third chamber in said piston rod upon contraction of said rod end variable volume chamber to maintain the same body of fluid in said rod end variable volume chamber and third chamber in said piston rod during repeated expansion and contraction of said rod end variable volume chamber, said piston rod includes surface means defining a passage in said piston rod extending between the third chamber and an outer side surface of said piston rod at a location outside of said cylinder means, said apparatus further including relief valve means in said piston rod for venting the third chamber through said passage when the fluid pressure in the thrid chamber exceeds ambient fluid pressure by a predetermined amount.

23. An apparatus as set forth in claim 22 further including check valve means for blocking fluid flow from the third chamber to the outer side surface of said piston rod through said passage when the fluid pressure in the third chamber exceeds ambient fluid pressure.

* * * * *